(12) United States Patent
Michau

(10) Patent No.: US 6,435,779 B1
(45) Date of Patent: Aug. 20, 2002

(54) METHOD AND APPARATUS FOR INTRODUCING A TABLET INTO A CLIMATE CONTROL SYSTEM

(75) Inventor: Don Michau, Bloomfield Hills, MI (US)

(73) Assignee: Bright Solutions, Inc., Troy, MI (US)

( * ) Notice: Subject to any disclaimer, the term of this patent is extended or adjusted under 35 U.S.C. 154(b) by 0 days.

(21) Appl. No.: 09/412,733

(22) Filed: Oct. 4, 1999

(51) Int. Cl.⁷ ............................................. B65G 53/00
(52) U.S. Cl. ..................... 406/197; 406/198; 406/98; 406/176; 62/125; 141/67
(58) Field of Search ............................. 406/50, 96, 98, 406/176, 197, 198, 148, 149, 147, 184; 141/67; 62/125

(56) References Cited

U.S. PATENT DOCUMENTS

| | | | |
|---|---|---|---|
| 3,837,139 A | 9/1974 | Roseberg | 53/59 R |
| 3,859,996 A * | 1/1975 | Mizzy et al. | 128/173 H |
| 4,067,449 A | 1/1978 | Adams et al. | 214/1 C |
| 4,610,574 A * | 9/1986 | Peters | 406/50 |
| 4,720,215 A | 1/1988 | Arena | 406/105 |
| 4,869,392 A | 9/1989 | Moulding, Jr. et al. | 221/1 |
| 4,928,739 A * | 5/1990 | Teubert | 141/5 |
| 4,938,063 A | 7/1990 | Leighley | 73/40.7 |
| 5,167,140 A | 12/1992 | Cooper et al. | 73/40.7 |
| 5,348,061 A | 9/1994 | Riley et al. | 141/104 |
| 5,357,782 A | 10/1994 | Henry | 73/40.7 |
| 5,421,192 A | 6/1995 | Henry | 73/40.7 |
| 5,440,919 A | 8/1995 | Cooper | 73/40.7 |
| 5,503,198 A * | 4/1996 | Becker | 141/67 |
| 5,557,834 A | 9/1996 | Miyanaka et al. | 29/407.05 |
| 5,650,563 A | 7/1997 | Cooper et al. | 73/40.7 |
| 5,656,305 A * | 8/1997 | Venrooij | 425/145 |
| 5,681,984 A | 10/1997 | Cavestri | 73/40.7 |
| 5,699,678 A | 12/1997 | Trigiani | 62/292 |
| 5,826,636 A | 10/1998 | Trigiani | 141/382 |
| 6,070,455 A * | 6/2000 | Cavestri | 73/40.7 |

* cited by examiner

Primary Examiner—Christopher P. Ellis
Assistant Examiner—Joe Dillon, Jr.
(74) Attorney, Agent, or Firm—Fish & Richardson P.C.

(57) ABSTRACT

A method and apparatus for introducing a tablet into a climate control system is described. The tablet can include a leak detection dye which is placed into appropriate locations within the system with a tablet inserter. The system can be an air conditioning system. The method can be partially or completely automated, allowing the tablet to be manipulated and inserted into a component of the climate control system during assembly remotely, avoiding direct contact with an individual participating in the system assembly and preventing or reducing contamination.

23 Claims, 1 Drawing Sheet

METHOD AND APPARATUS FOR INTRODUCING A TABLET INTO A CLIMATE CONTROL SYSTEM

BACKGROUND OF THE INVENTION

The present invention relates to a method and apparatus for introducing a tablet into a climate control system, in particular a component of an air conditioning system.

Dyes can be used to detect leaks in fluid systems, such as climate control systems, hydraulics, engine oil systems, automatic transmission systems, fuel systems, brake systems, or radiator coolant systems. Climate control systems include heating, cooling, ventilating, and air conditioning systems. Some methods operate by adding emissive substances such as, for example, fluorescent or phosphorescent dyes to the climate control system. Suitable leak detection dyes include a naphthalimide dye, a perylene dye, a thioxanthane dye, a coumarin dye, or a fluorescein dye, and derivatives thereof. Leaks can be detected by observing fluorescence of the dye at leak sites by exciting the dye with a light source having suitable wavelength or intensity. In general, the dyes fluoresce brightly when excited by light in the 190 to 700 nanometer wavelength range.

A variety of systems have been developed to introduce a leak detection dye into air conditioning systems. For example, previous injector designs include flow-chamber systems and syringe-type (e.g., caulking gun-type) systems for introducing liquid dyes into the system. A flow-chamber system generally has a reservoir into which a leak detection dye solution is poured or a dye capsule is loaded and sealed. A carrier is then passed through the reservoir to transport the dye into the system. A syringe-type system generally has a chamber that is loaded by pouring the leak detection dye into the chamber or is preloaded by the manufacturer. The dye is then forced from the chamber into the closed system. Other injector systems include mist diffusers.

SUMMARY OF THE INVENTION

The invention features a method and apparatus for introducing a tablet into a climate control system using a tablet inserter. The tablet can include a leak detection dye. Tablet insertion into a component using a tablet inserter can prevent or reduce tablet breakage. The method is partially or completely automated, allowing the tablet to be manipulated and inserted remotely into a component of the climate control system during assembly, avoiding direct contact with an individual participating in the system assembly. By eliminating or reducing contact with an individual, contamination of the individual, the tablet, and the assembly plant can be reduced. Moreover, partial automation of the tablet insertion process can improve assembly speed and tablet dispensing accuracy.

In one aspect, the invention features a method of introducing a tablet into a climate control system. The method includes moving a tablet from a tablet inserter into a component of the climate control system. A gas can flow through the tablet inserter to move the tablet from the tablet inserter into the component. For example, the flow of gas can include blowing a portion of the gas (e.g., compressed air) through the tablet inserter. The method can include aligning the tablet inserter with an entry opening of the component prior to moving the tablet into the component. The method can include placing the tablet into the tablet inserter prior to moving the tablet into the component.

In another aspect, the invention features a method of introducing a tablet into a climate control system including passing a tablet through a feeder line from a tablet dispenser into a tablet inserter, aligning the tablet inserter with an entry opening of the component, and blowing a portion of a gas through the tablet inserter, thereby moving the tablet from the tablet inserter into the component to move a tablet from the tablet inserter into the component.

In yet another aspect, the invention features an apparatus for introducing a tablet into a component of a climate control system. The apparatus includes a tablet dispenser and a tablet inserter. The tablet inserter has an exit orifice that fits within or around an opening of the component.

The tablet can be placed into the tablet inserter with a tablet dispenser, such as an automated tablet dispenser. The tablet can be passed through a feeder line from the tablet dispenser into the tablet inserter. The tablet can be inserted into a component of a climate control system which is capable of containing the tablet, such as a component having an opening into which the tablet can be inserted. For example, the component can be an air conditioning system condenser or an air conditioning system accumulator. When the system is assembled from modular units, the component can be a section of a partially assembled climate control system, including a system hose line. The climate control system can be assembled after moving the tablet into the component.

Additional features and advantages of the invention will become apparent from the detailed description of the invention.

DETAILED DESCRIPTION OF THE PREFERRED EMBODIMENT

Figure 1:
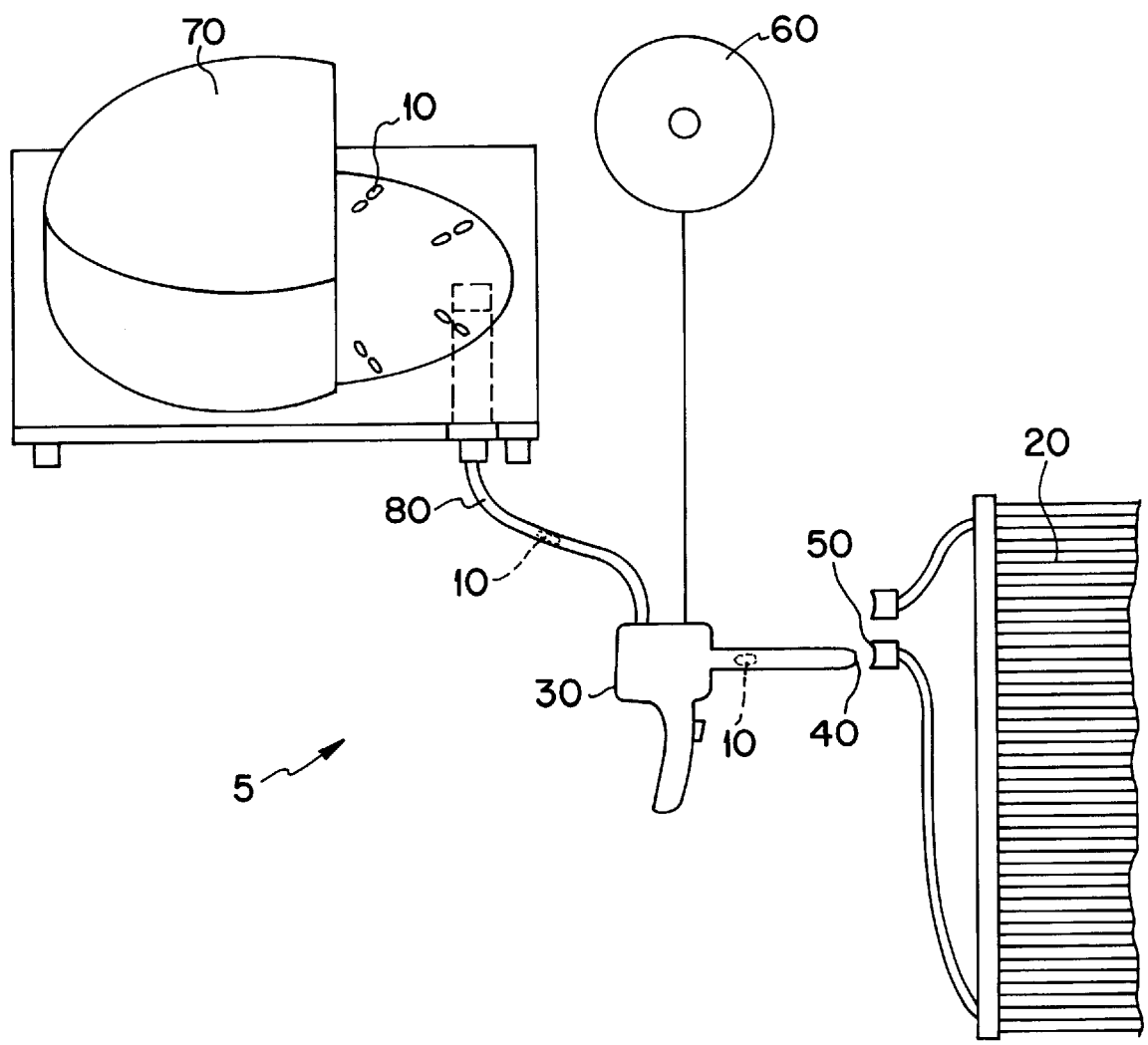
FIG. 1 is a schematic diagram of an apparatus for introducing a tablet into a climate control system.

The method and apparatus of the invention can be used to introduce a tablet, such as a fluorescent dye tablet into an air conditioning system by avoiding manual handling of the tablet during insertion. Introducing a leak detection dye as a tablet during the assembly of the climate control system can enable the system to be tested for leaks to provide a quality assurance tool prior to shipment of the system. It can also facilitate checking the system for leaks at a later time in the field without charging the system with additional leak detection dye. The tablet can provide a simple way to insert dyes into, for example, an air conditioning system rapidly and cleanly, without needing to charge the system with refrigerant at the time of dye insertion. Installation during assembly also allows manufacturers to test products on site, permitting the rapid identification of leaks. By introducing the tablet in an automated or partially automated process, the risk of contaminating the work environment with the dye, which can lead to erroneous leak detection, can be reduced. Moreover, the fixed size of the tablet can allow a more precise amount of leak detection dye to be introduced into the system.

In general, a compressed gas-operated tablet introduction device that functions in conjunction with a tablet dispenser is used to insert the tablet into a component of the air conditioning system. The tablet dispenser feeds tablets into an compressed gas-operated tablet injection gun that can blow the tablet into an opening of the component, for example, using pressurized air. Pressurized air is readily found in manufacturing and assembly plants, such as automotive assembly plants.

The method and apparatus can be used to insert a tablet into a component for an air conditioning or refrigeration system when the component is assembled or manufactured, when a module of an air conditioning or refrigeration system is assembled from a component, or a complete air conditioning or refrigeration system is assembled. The method and apparatus can be incorporated into an automobile assembly line. Examples of automobile assembly lines are described, for example, in U.S. Pat. No. 5,557,834 or U.S. Pat. No. 4,815,150, each of which is herein incorporated by reference in its entirety.

Insertion location, tablet properties, and dye properties can be selected to improve cost, dissolution rate, ease of insertion, cleanliness of handling, capital equipment costs, material waste, environmental impact, shelf life prior to insertion in the system, and chemical life once introduced into the system.

The tablets that contain leak detection dyes are described, for example, in U.S. Pat. No. 6,070,455, which is herein incorporated by reference in its entirety.

The tablet can include a leak detection dye and a binding agent. The leak detection dye can include a naphthalimide dye, a perylene dye, a coumarin dye, a thioxanthane dye, or a derivative thereof. The binding agent can be a substance that aids cohesiveness, for example, by improving the structural integrity of the structure. The binding agent can also aid dissolution of the dye. The binding agent can include a fatty acid, a fatty alcohol, a fatty acid ester, a resin, a polyalkylene glycol (e.g., a polyethylene glycol), or a polyol ester, such as stearic acid, methyl stearate, coconut oil, tricaprin, hydrenol, Lorol(C16), Lorol(C18), cocoa butter, methyl laurate, methyl myristate, coconut fatty acid, or methyl coconate. The tablet can also include a silicone, a phosphate ester, or a lubricant additive.

The tablet is a solid or semi-solid structure that can include a dye. The tablet can be formed by compacting or extruding a mixture of the dye and the binding agent. The tablet can be round tablets, elongated tablets, briquettes, spheres, discs, beads, pellets, pills, capsules, cylinders, or other solid or semi-solid shapes. The tablets can be of a size that facilitates insertion into the system component.

The climate control system can be a heating, ventilating, refrigeration, or air conditioning system. The air conditioning system can be an automotive, portable, residential, or commercial air conditioning system. Once assembled, the air conditioning system can be charged with a refrigerant. The refrigerant can include chlorofluorocarbons, hydrochlorofluorocarbons, hydrofluorocarbons, carbon dioxide, ammonia, halogenated or ether derivatives of methane or ethane, or halogenated ether or cyclic derivatives of propane, butane, pentane, or other hydrocarbons. The system can also include a system lubricant. The leak detection dye and the binding agent can be soluble in the refrigerant, the system lubricant, or the refrigerant-system lubricant mixture.

The tablet is introduced into a component of the climate control system. The component has an opening into which the tablet can be inserted. The dimensions of the tablet facilitate insertion into the particular component opening. The location for placement of the structure can be selected to increase the dissolution rate of the tablet. For example, components that have a greater flow of refrigerant, in gas or liquid form, or a greater flow of system lubricant can be selected to provide more rapid dissolution rates. Similarly, components that contain the refrigerant or the system lubricant at higher temperatures can be selected to provide more rapid dissolution rates. In an air conditioning system, the component can be a receiver drier, a filter drier, an accumulator, a compressor, a condenser, a high pressure discharge line, a discharge muffler, an expansion device (e.g., an expansion valve or orifice tube), a low pressure suction line, a suction muffler, or an evaporator. When an accumulator and receiver dryer are not present in the system, the component can be a filter assembly. The tablet can be inserted into an opening or inlet of the component. The tablet can be placed in a system in locations that do not require immobilization of the tablet. Preferably, the tablet is placed in a non-dehydrator portion of the climate control system where enhanced dissolution can occur.

After placing the tablet into an air conditioning system, the system can be charged with a refrigerant. A system lubricant can be in the system when charged with the refrigerant. The system can be evacuated before charging to reduce the amount of air contaminating the system. Once charged, the system is operated to circulate the refrigerant and system lubricant. The circulating refrigerant, system lubricant, or refrigerant-system lubricant mixture disperses the leak detection dye with the system lubricant. The system lubricant carries the dye throughout the system. Once dissolved, the dye content of the system can be below about 0.1 percent. After the dye has been allowed to circulate within the system, system components, joints, or attachments can be examined with a light source having a light emission wavelength from 190 nanometers to 700 nanometers. The presence of a leak can be determined by the presence of a colored visual indication, such as fluorescence or other emission, that can be detected after excitation with light from the light source.

Referring to FIG. 1, tablet insertion apparatus 5 introduces tablet 10 into component 20 of a climate control system. Component 20 can then be incorporated into a complete climate control system. Alternatively, component 20 can be a section of a partially assembled climate control system at the time of introducing the tablet. Component 20 can be, for example, a condenser, an accumulator, or a system hose line. Tablet 10 is delivered to component 20 using tablet inserter 30. Tablet inserter orients tablet 10 so that it can be efficiently moved into component 20. Tablet 10 can be moved from tablet inserter 30 into component 20 pneumatically, by a portion of gas that is blown or jetted through tablet inserter 30. The portion of gas can be pressurize air or compressed air. The tablet inserter can be an air gun. The tablet inserter moves the tablet into the component and avoids damaging the component.

The inserter can allow a single tablet to be introduced into the component, or if so desired, multiple tablets can be introduced. The number of tablets introduced in the component is selected so that the desired amount of material is placed into the system. The inserter can place the total amount of material into the component in a single step. The inserter can orient the tablet for introduction in manner similar to that described for delivering and orienting rivets. See, for example, U.S. Pat. No. 4,720,215, which is herein incorporated by reference in its entirety. The inserter can be an air gun such as, for example, an air powered dispersing gun available from Albion Engineering Co., Philadelphia, Pa.

Tablet inserter 30 has exit orifice 40 that is aligned with entry opening 50 of component 20 prior to moving tablet 10 into the component. Exit orifice 40 fits within entry opening 50 of component 20, which facilitates moving tablet 10 into component 20 without breaking. Alternatively, exit orafice 40 can fit around opening 50 to connect inserter 30 to the component. When fitting around the opening, the exit orafice can contract around the opening to form a partial seal. Tablet inserter 30 is attached to balancer 60 which assists the operator of the system in handling the inserter. The balancer can be a suspending balancer such as, for example, a balancer available from Nasco Inc., Ft. Lauderdale, Fla. The operator can be a human or a robot. Partial or complete automation of the process allows it to be completed more rapidly and more cleanly than manual handling of the tablet to insert it into a component.

Tablet 10 is placed into tablet inserter 30 prior to moving the tablet into the component using tablet dispenser 70. Tablet dispenser 70 can be fed tablets from a hopper or other storage device. Tablet 10 passes through feeder line 80 from tablet dispenser 70 into tablet inserter 30. Tablet dispenser 70 can be an automated tablet dispenser. Tablet dispenser 70 can move and orient the tablet to be fed into tablet inserter 30 without direct handling by the operator. This can reduce tablet breakage and contamination. The tablet dispenser can also reject broken or inferior tablets when detected by the dispenser. Tablet dispensers and manipulators are described in U.S. Pat. Nos. 5,348,061, 4,869,392, 4,067,449, and 3,837,139, each of which is each of which is herein incorporated by reference in its entirety.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method of introducing a tablet into a climate control system comprising moving a tablet from a tablet inserter into a component of the climate control system and assembling the climate control system after moving the tablet into the component.

2. The method of claim 1 further comprising flowing a gas through the tablet inserter, thereby moving the tablet from the tablet inserter into the component.

3. The method of claim 1 further comprising aligning the tablet inserter with an entry opening of the component prior to moving the tablet into the component.

4. The method of claim 1 wherein the component is an air conditioning system condenser.

5. The method of claim 1 wherein the component is an air conditioning system accumulator.

6. The method of claim 1 wherein the tablet inserter is an air gun.

7. The method of claim 1 wherein the component is a section of a partially assembled climate control system.

8. The method of claim 1, further comprising charging the climate control system with a refrigerant after moving the tablet.

9. The method of claim 1, further comprising:
orienting the tablet; and
feeding the tablet into the tablet inserter.

10. The method of claim 1 wherein the tablet includes a leak detection dye.

11. The method of claim 10 wherein the leak detection dye includes a naphthalimide dye.

12. The method of claim 1 further comprising placing the tablet into the tablet inserter prior to moving the tablet into the component.

13. The method of claim 12 wherein the tablet is placed into the tablet inserter with a tablet dispenser.

14. The method of claim 13 wherein the tablet dispenser is automated.

15. The method of claim 13 further comprising passing the tablet through a feeder line from the tablet dispenser into the tablet inserter.

16. A method of introducing a tablet into a climate control system comprising:
aligning a tablet inserter with an entry opening of a component of the climate control system; and
blowing a gas through the tablet inserter, thereby moving the tablet from the tablet inserter into the component wherein the component is a section of a partially assembled climate control system.

17. The method of claim 16 wherein the component is an air conditioning system condenser.

18. The method of claim 16 wherein the component is an air conditioning system accumulator.

19. The method of claim 16 further comprising assembling the climate control system after moving the tablet into the component.

20. The method of claim 16, further comprising charging the climate control system with a refrigerant after blowing the gas.

21. The method of claim 16, further comprising:
orienting the tablet; and
feeding the tablet into the tablet inserter.

22. The method of claim 16 wherein the tablet includes a leak detection dye.

23. The method of claim 20 wherein the leak detection dye includes a naphthalimide dye.

* * * * *